US008755664B2

(12) United States Patent
Balfour

(10) Patent No.: US 8,755,664 B2
(45) Date of Patent: Jun. 17, 2014

(54) CABLE GROUND CLAMP ASSEMBLY

(75) Inventor: William J. Balfour, Torrington, CT (US)

(73) Assignee: Electric Motion Company, Inc., Winsted, CT (US)

( * ) Notice: Subject to any disclaimer, the term of this patent is extended or adjusted under 35 U.S.C. 154(b) by 97 days.

(21) Appl. No.: 13/368,728

(22) Filed: Feb. 8, 2012

(65) Prior Publication Data

US 2012/0288250 A1 Nov. 15, 2012

Related U.S. Application Data

(60) Provisional application No. 61/440,465, filed on Feb. 8, 2011.

(51) Int. Cl.
*G02B 6/00* (2006.01)

(52) U.S. Cl.
USPC .......................................................... 385/136

(58) Field of Classification Search
USPC .......................................................... 385/136
See application file for complete search history.

(56) References Cited

U.S. PATENT DOCUMENTS

2004/0113723 A1* 6/2004 Motooka et al. .............. 333/202
2005/0133244 A1* 6/2005 Devine et al. ................ 174/68.2
2006/0283619 A1* 12/2006 Kowalczyk et al. ............ 174/78

* cited by examiner

*Primary Examiner* — Jerry Blevins
(74) *Attorney, Agent, or Firm* — Alix, Yale & Ristas, LLP

(57) ABSTRACT

A grounding clamp assembly for a cable having a spiral metal shield employs a first clamp and a second clamp. The clamps have concave cradles. The clamps are forced together around the cable. A biased contact element connects with a conductive strip extending from one of the clamps. The cable is captured between the cradles, and the contact element engages the shield.

15 Claims, 16 Drawing Sheets

CABLE GROUND CLAMP ASSEMBLY

CROSS-REFERENCE TO RELATED APPLICATION

This application claims the priority of U.S. Provisional Patent Application No. 61/440,465 filed on Feb. 8, 2011, the disclosure of which is incorporated by reference in its entirety.

BACKGROUND

This disclosure relates generally to devices and techniques for grounding cables. More particularly, this disclosure relates to devices and techniques for grounding cables having a conductive shield.

DETAILED DESCRIPTION

Figure 1:
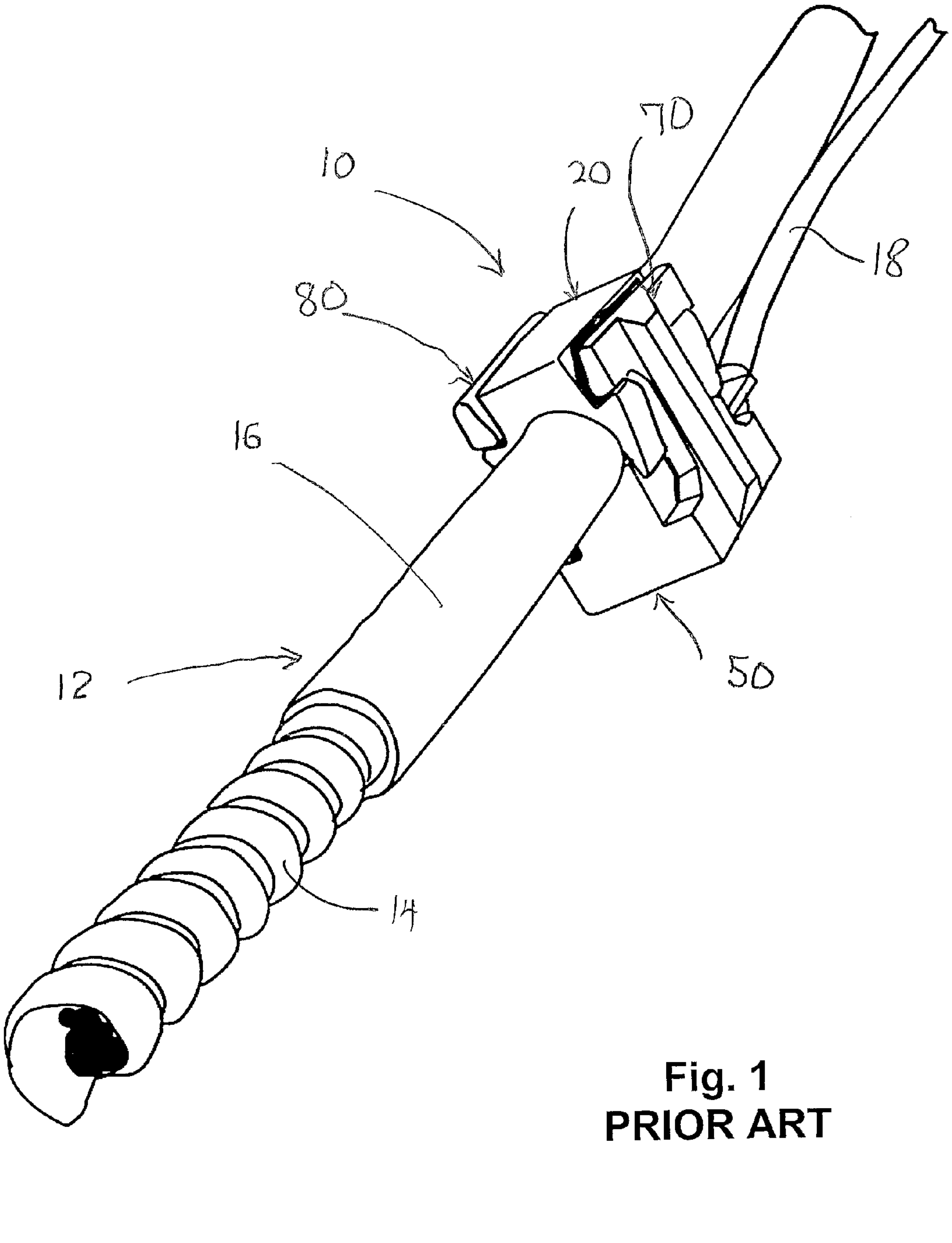
Fig. 1 PRIOR ART
FIG. 1 is a perspective view of a cable ground clamp assembly as installed on a representative cable.

With reference to the drawings wherein like numerals represent like parts throughout several Figures, a ground clamp assembly which is especially adapted to ground the shield of a fiber optic cable is generally designated by the numeral 10. A representative cable 12 includes a conductive shield 14 and an insulated covering 16.

Cables to which the ground clamp assembly has particular application typically have several different sizes in terms of diameter dimensions. Furthermore, because the ground clamp assembly may be affixed to either the cable over the insulated covering of the cable or against the bare shield of the cable, clamp assemblies suitable for various relative dimensions and configurations and as adapted for a given cable grounding application are described. Generally, as described below, each clamp assembly 10 includes a first clamp member 20 and a second clamp member 50 which are selected for a given cable size and efficiently installed around a portion of the cable in an interlocked relationship with a ground wire 18 extending from the ground clamp assembly for connecting with the ground.

The clamp members 20 and 50 each generally have the same geometry, but are dimensioned and configured in various sizes to accommodate both the dimension of the cable and whether the portion of the cable to which the clamp assembly is affixed is insulated or is a bare shield. Various letter designations are added to denote relative size and cable applications. For purposes of description only, clamp 20 is the top clamp in FIGS. 2A-7C and clamp 50 is the bottom clamp. It should be appreciated that for actual installations in the field, the orientation is essentially universal and the described orientation is arbitrary. Both the top clamp 20 and the bottom clamp 50 are molded components formed of plastic materials such as glass filled polycarbonate.

With reference to FIGS. 2A-2D, 8A and 9A, top clamp 20 has a generally rectilinear base 22 of elongated form with a generally planar top surface 24 which extends between planar ends 26 and 28. The opposing (lower) portion of the base forms an elongated cable cradle 30 at least partially defined by an upper concave clamp surface 32 which is configured to engage against the cable. Opposed pairs of wing-like locking arms 36 and 38 extend away (downwardly) from the concave surface 32 so that the end profile of the cable cradle has a substantially U-shaped configuration. The locking arms have an inwardly extending shoulder 40 adjacent a ramp surface 42. Each shoulder 40 extends inwardly at a slight angle to facilitate the interlocking with clamp 50 as further described below. It will be appreciated that the locking arms 36, 38 essentially form a generally V-shaped transverse section as illustrated, for example, in FIG. 2B.

Figure 10:
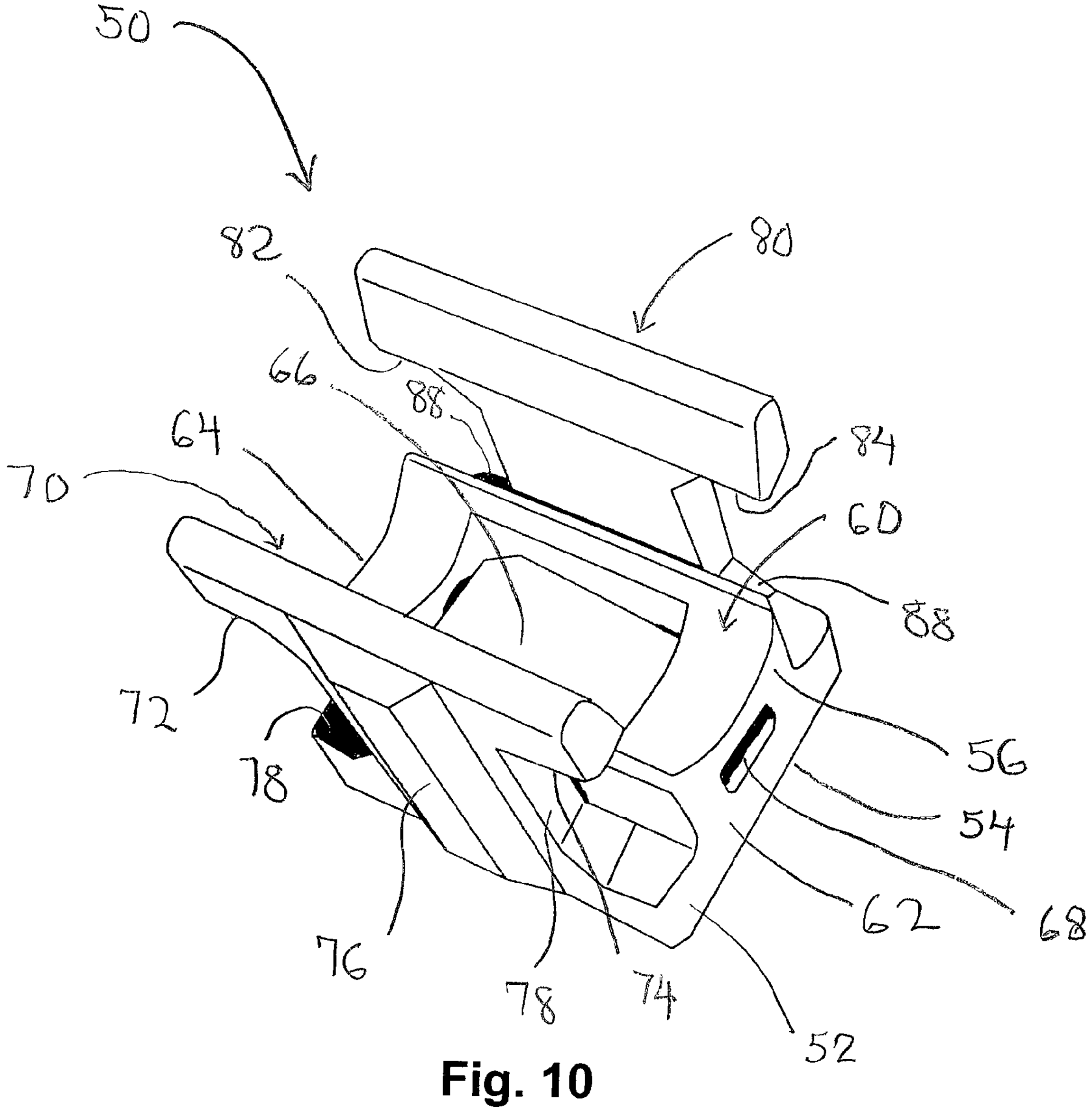
FIG. 10 is a perspective view of a portion of the second clamp member of FIG. 2A.
Figure 11:
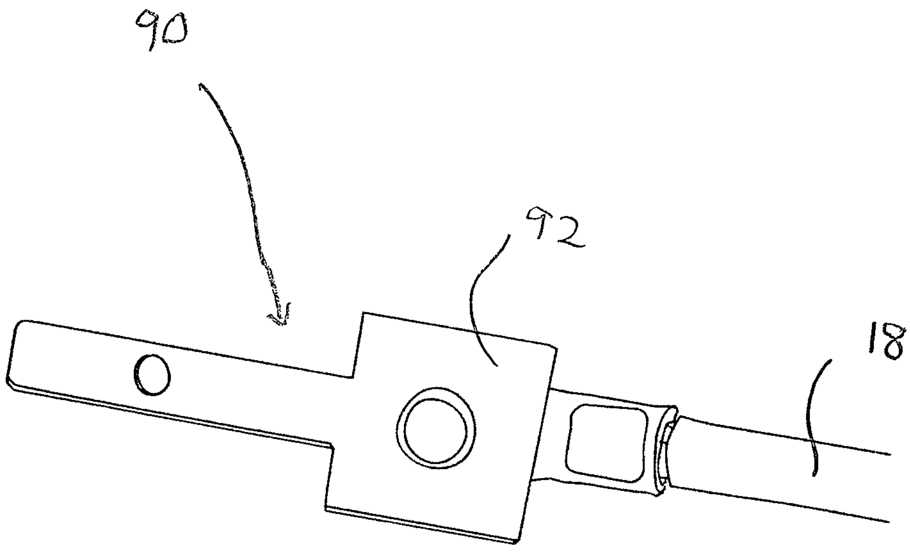
FIG. 11 is a fragmentary top perspective view of a connector sub-assembly for the second clamp member of FIG. 10.
Figure 12:
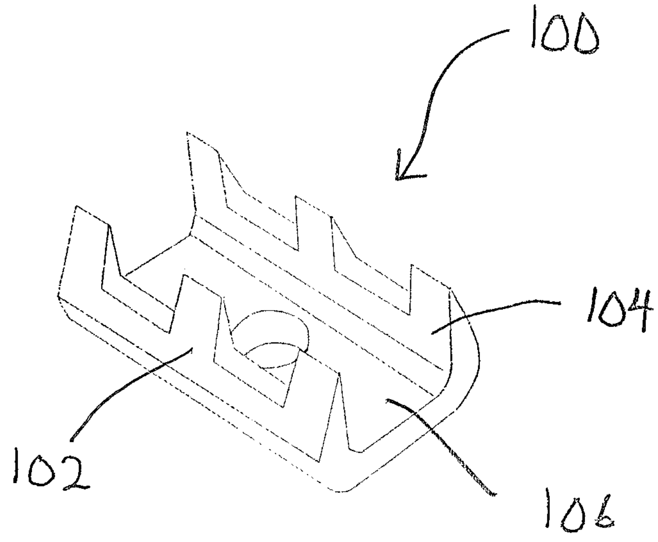
FIG. 12 is a perspective view of a conductor contact component employed in the second clamp member of FIG. 10.
Figure 13:
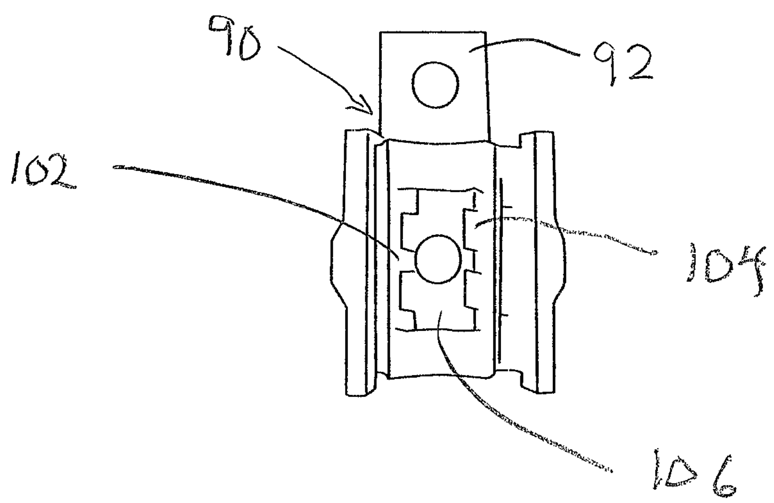
FIG. 13 is a top perspective view of the second clamp member of FIG. 10 in a first pre-assembled stage.
Figure 14:
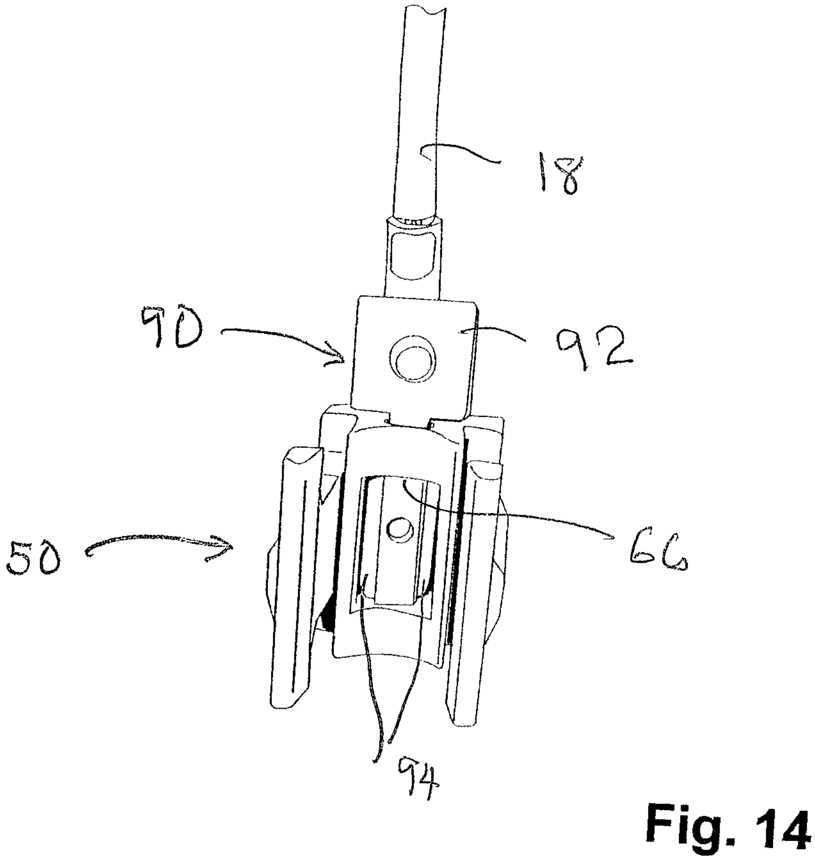
FIG. 14 is a top perspective view of the second clamp member of FIG. 10 in a second pre-assembled stage.
Figure 15:
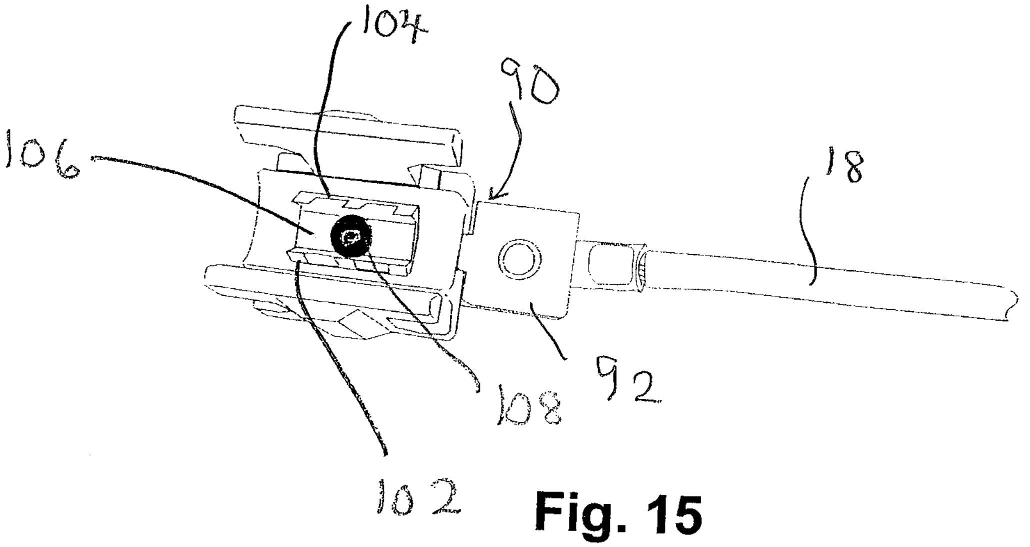
FIG. 15 is a top perspective view of the second clamp member of FIG. 10 in a third assembly stage.

With additional reference to FIG. 10, the bottom clamp 50 includes a generally rectilinear base 52 with a planar bottom surface 54 and an opposite raised platform 56 which forms a cable cradle 60 having a generally arcuate or concave contour. The cradle 60 extends between opposed ends 62, 64 and is adapted to clamp against a portion of the cable. A central recess 66 is formed in the platform and communicates via an axial access slot 68 at one end of the clamp member 50.

A pair of laterally spaced, generally T-shaped locking structures 70 and 80 project (upwardly) from the base. The locking structures form aligned axially spaced catches 72, 74 and 82, 84 which are dimensioned and positioned to engage the shoulders 40 of the top clamp member. The catches have a slight angle which is complementary to that of the shoulders. The structures 70 and 80 are generally resilient and include an integral medial reinforcement bar 76 and 86. The structural members further define axially spaced, generally C-shaped access slots 78 and 88 for receiving the terminal portions of the locking arms 36, 38 of the top clamp 20.

With additional reference to FIGS. 11-15, a conductive strip 90, which includes an enlarged terminal plate 92, is inserted into the slot 68. A resilient element 94 (FIG. 14) is positioned in the receptacle 66 below the conductive strip. The resilient element 94 is preferably a silicon based all temperature rubber. A conductive element 100 (FIG. 12) has a compound bend which forms a pair of laterally spaced prongs 102 and 104. The element 100 includes a medial anchoring base 106 which engages against the top of the conductive strip and is secured by a screw 108 or other fastener. The prongs preferably extend upwardly into the cable cradle 60 and are oriented to pierce the insulation and engage the shield of a received cable. In a preferred form, the prongs 102, 104 are each segmented into a row of three teeth.

Figure 2B:
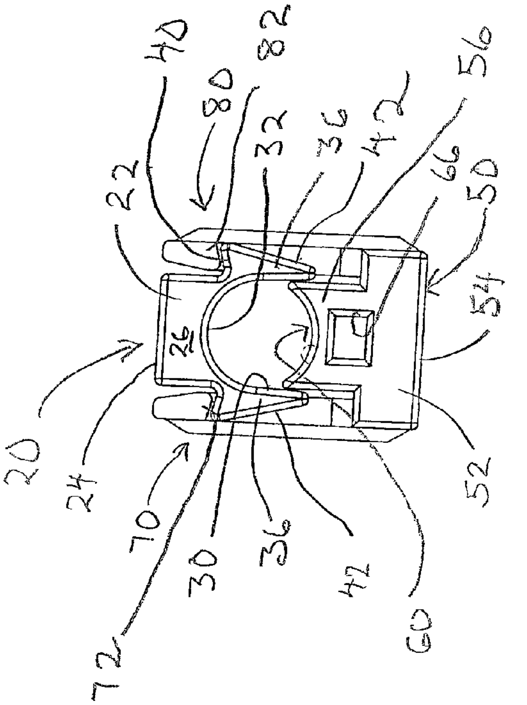
FIG. 2B is an end elevational view of the clamp assembly of FIG. 2A.
Figure 2D:
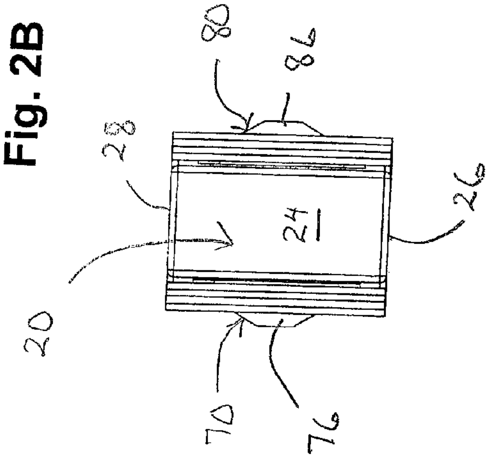
FIG. 2D is a top plan view of the clamp assembly of FIG. 2A.
Figure 2A:
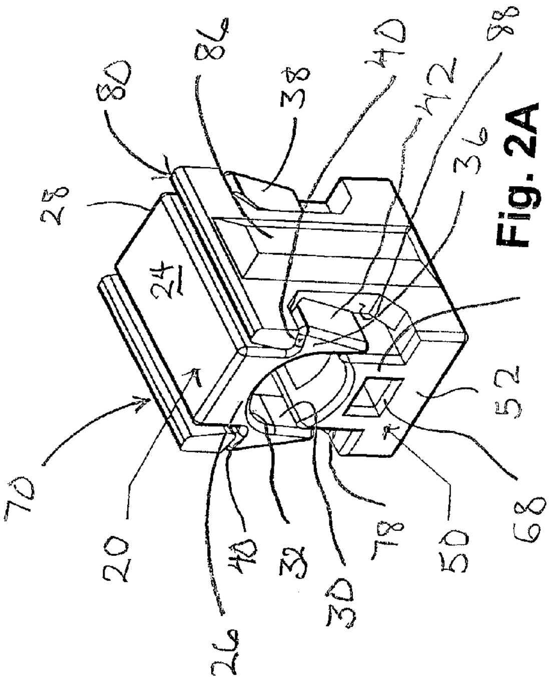
FIG. 2A is a perspective view, portions removed, of an interlocked clamp assembly for a cable having a representative first dimension and adapted for installation around an insulation portion thereof.
Figure 2C:
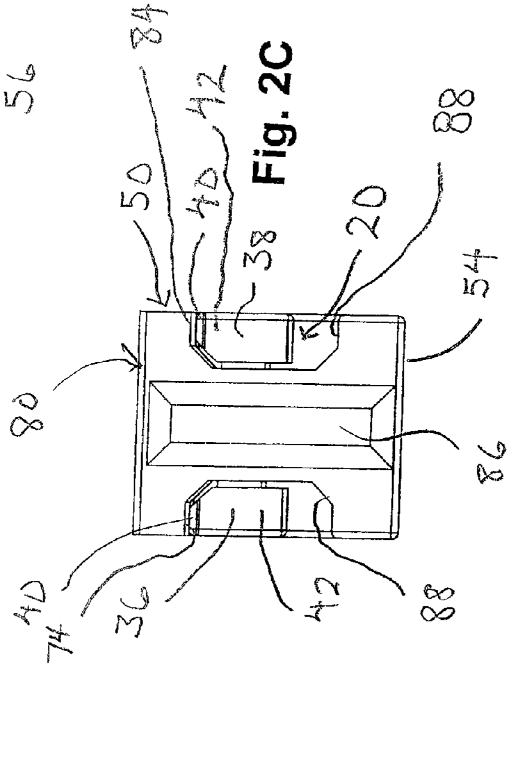
FIG. 2C is a side elevational view of the clamp assembly of FIG. 2A.

The clamp assembly is partially illustrated in an interlocking relationship in FIGS. 2A-2D without the cable and without the ground wire assembly so that the interlocking relationship may be better described. When the top clamp 20 and the bottom clamp 50 are forced into an interlocking relationship, as illustrated, the ramps 42 of the locking arms slide against interior surfaces of the locking structures 70, 80 until the shoulders 40 clear the catches 72, 74 and 82, 84 and are engaged by the catches. Each pair of the locking arms 36, 38 is received in the respective formed slots 78 and 88. It will be appreciated that there are two pairs of axially spaced locking arms which engage the catches in a substantially four point interlocking relationship. The cradles 30 and 60 are dimensioned so that the clamp surfaces firmly engage against the opposed portions of the cable, as best illustrated in FIGS. 2B and 2C.

It should be appreciated that the top clamp 20 and the bottom clamp 50 are dimensioned in FIGS. 2A-2D for a representative, small cable wherein the clamp assembly is to be engaged around the insulation of the cable.

Figure 3A:
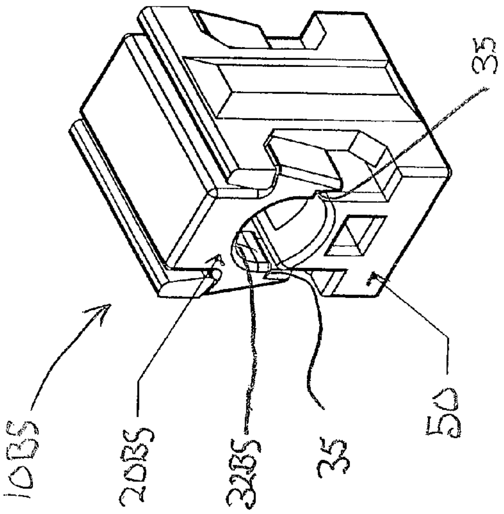
FIG. 3A is a perspective view, portions removed, of an interlocked clamp assembly for a cable having the first dimension and adapted for installation around a bare shield portion thereof.
Figure 3C:
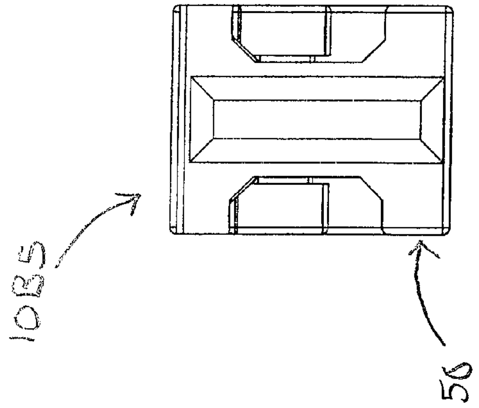
FIG. 3C is a side elevational view of the clamp assembly of FIG. 3A.
Figure 3B:
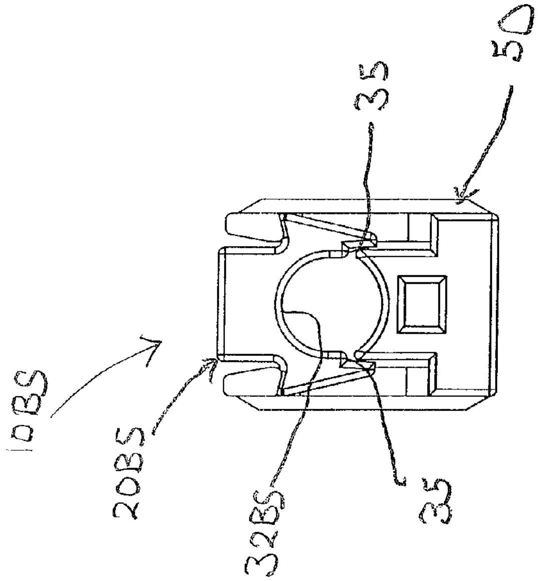
FIG. 3B is an end elevational view of the clamp assembly of FIG. 3A.
Figure 8B:
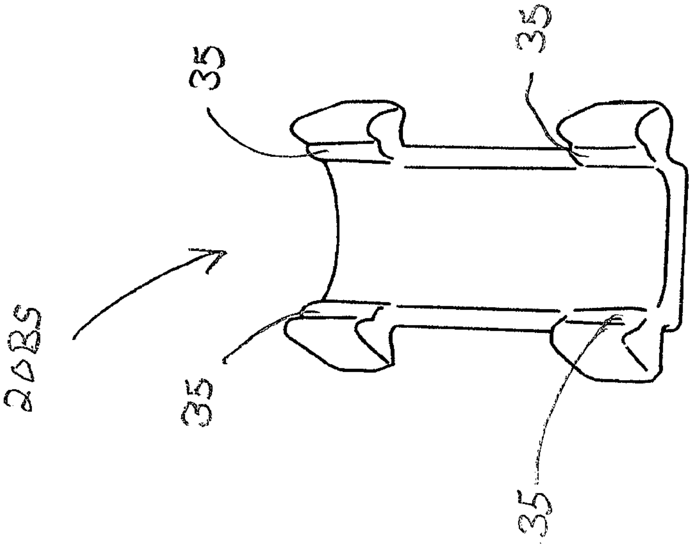
FIG. 8B is a top perspective view of a first clamp member for the clamp assembly of FIG. 3A.
Figure 8A:
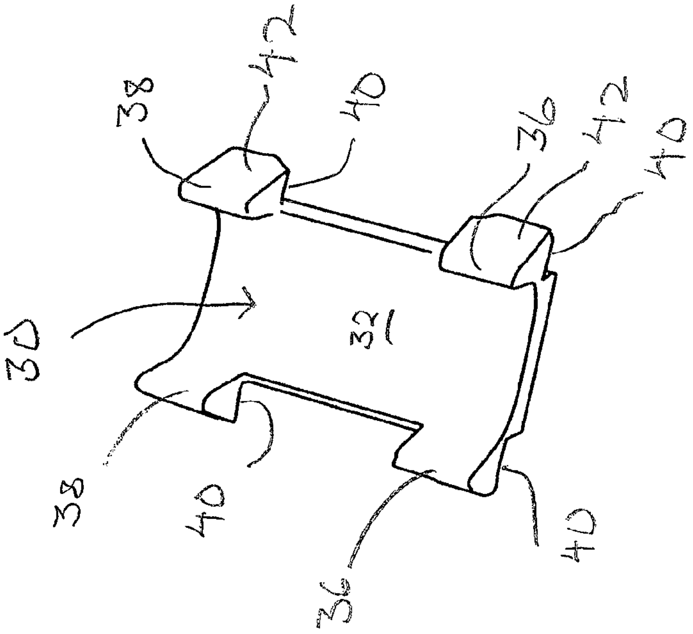
FIG. 8A is a top perspective view of a first clamp member for the clamp assembly of FIG. 2A.
Figure 9B:
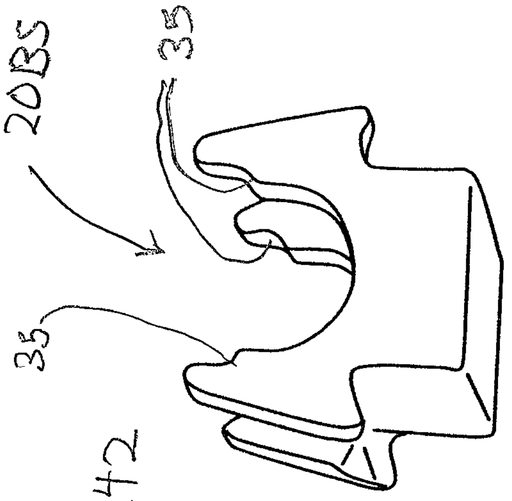
FIG. 9B is an end perspective view of the first clamp member of FIG. 8B.
Figure 9A:
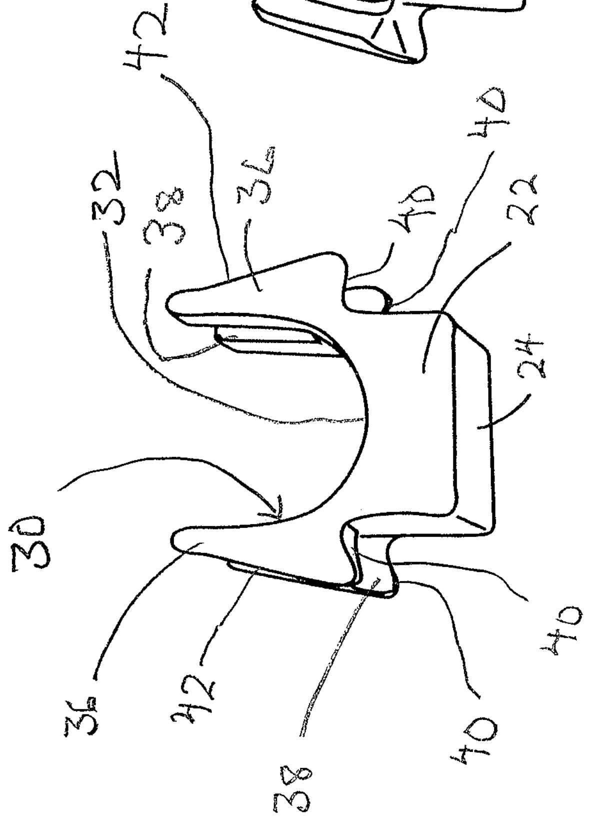
FIG. 9A is an end perspective view of the first clamp member of FIG. 8A.

By contrast, FIGS. 3A-3C represent a clamp assembly (portions removed) for effecting a grounding connection wherein the cable clamps around the bare shield of the identically sized cable. The modifications are designated with the BS suffix. The only significant modification is the top clamp 20BS being dimensioned so that the cradle surface 32BS is slightly smaller. This requires a transition shoulder 35 that is best illustrated in FIGS. 3B, 8B and 9B. The other components including the bottom clamp assembly 50 are substantially the same as previously described.

Figure 4A:
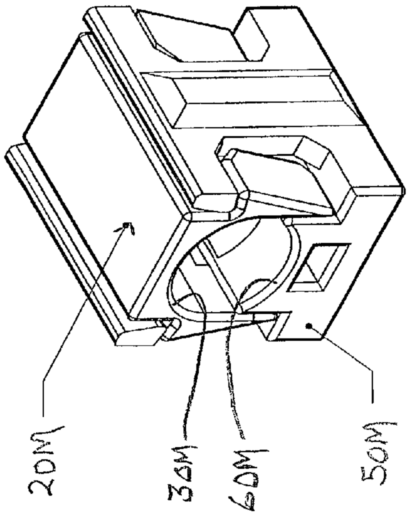
FIG. 4A is a perspective view, portions removed, of an interlocked clamp assembly for a cable having a second dimension and adapted for installation around an insulated portion thereof.
Figure 4B:
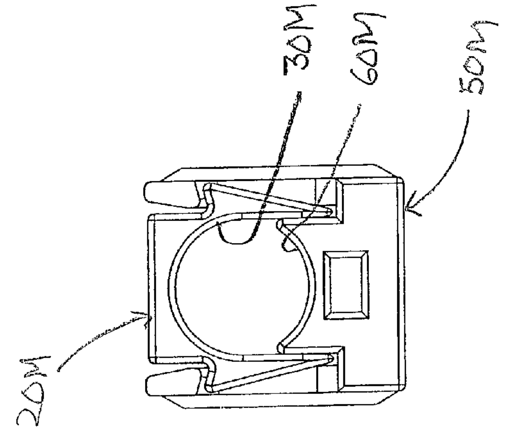
FIG. 4B is an end elevational view of the clamp assembly of FIG. 4A.
Figure 4C:
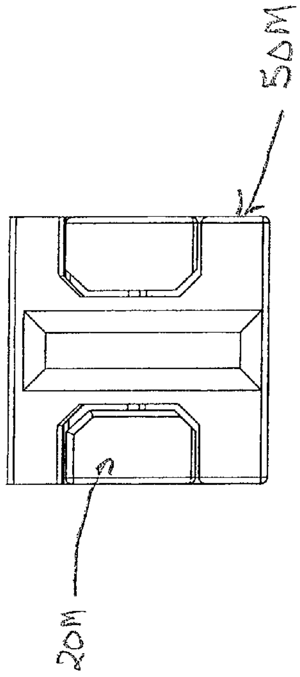
FIG. 4C is a side elevational view of the clamp assembly of FIG. 4A.
Figure 5B:
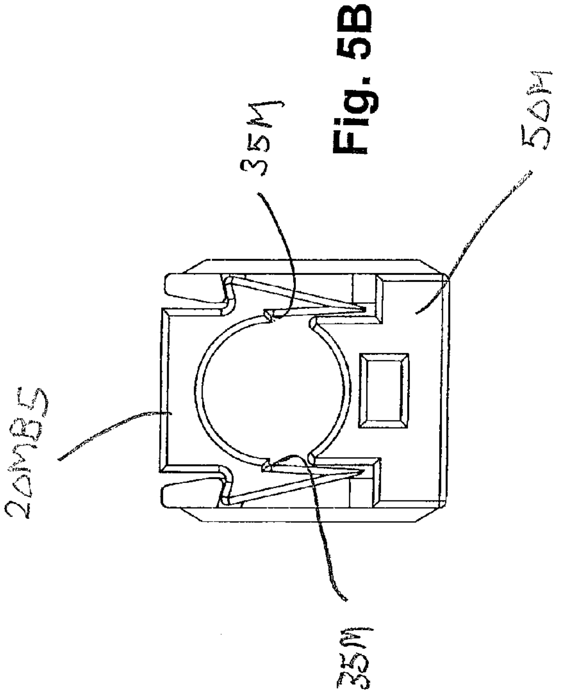
FIG. 5B is an end elevational view of the clamp assembly of FIG. 5A.
Figure 5A:
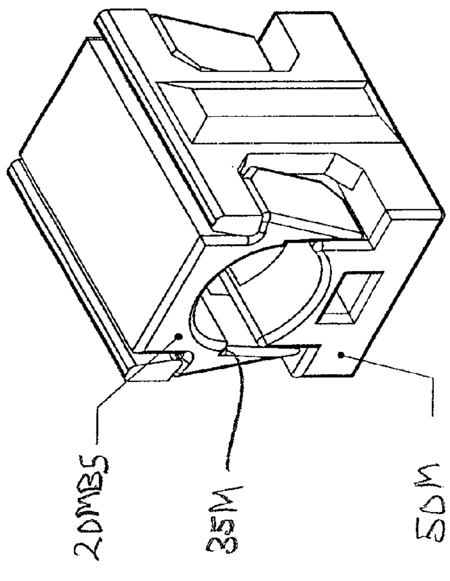
FIG. 5A is a perspective view, portions removed, of a clamp assembly for the cable having the dimension of FIG. 4A and adapted for installation around a bare shield portion thereof.
Figure 5C:
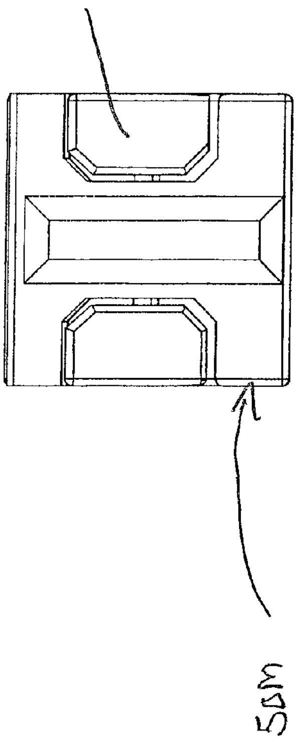
FIG. 5C is a side elevational view of the clamp assembly of FIG. 5A.

With reference to FIGS. 4A-4C, a ground clamp assembly (portions removed) for a representative, medium cable employs clamp members designated by the numerals 20M and 50M. The only significant differences between that described for clamps 20 and 50 is the dimensioning wherein the cradles 30M and 60M are dimensioned with convex surfaces to accommodate the greater diameter of the cable. It will be appreciated that in the event that it is decided to affix a clamp to a portion of the medium cable wherein the shield is bare, then the top clamp 20MBS would be dimensioned with a slightly smaller cable cradle 30MBS and configured with shoulder 35M, as illustrated in FIGS. 5A-5C.

Figure 6A:
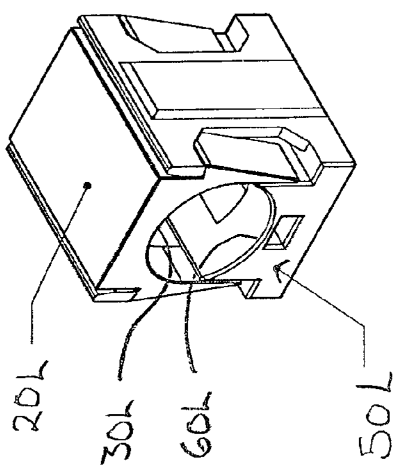
FIG. 6A is a perspective view, portions removed, of a clamp assembly for a cable having a third dimension larger than first and second dimensions and adapted for installation around an installation portion thereof.
Figure 6B:
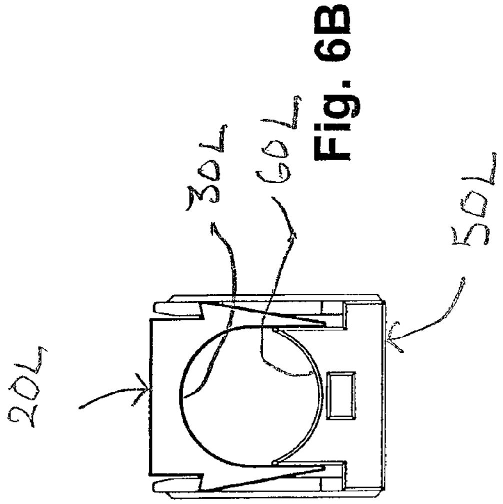
FIG. 6B is an end elevational view of the clamp assembly of FIG. 6A.
Figure 6C:
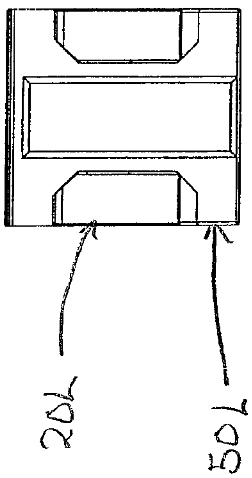
FIG. 6C is a side elevational view of the clamp assembly of FIG. 6A.
Figure 7A:
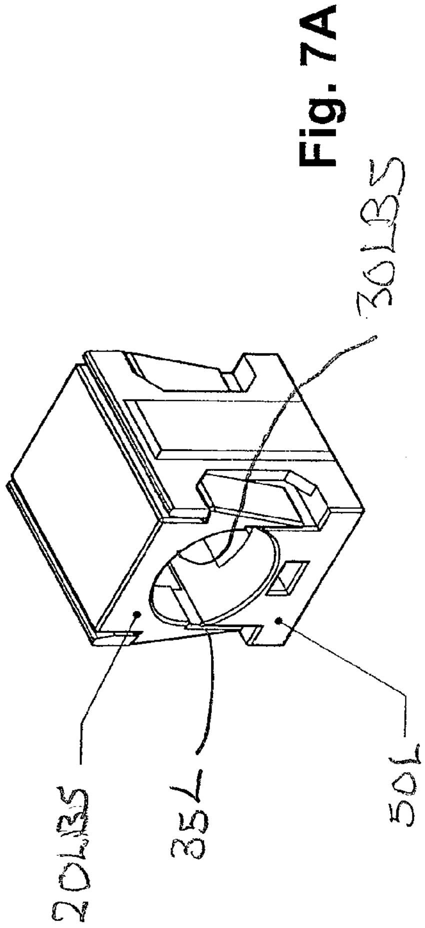
FIG. 7A is a perspective view, portions removed, of a clamp assembly for a cable having the dimension of FIG. 6A and adapted for installation around a bare shield portion thereof.
Figure 7B:
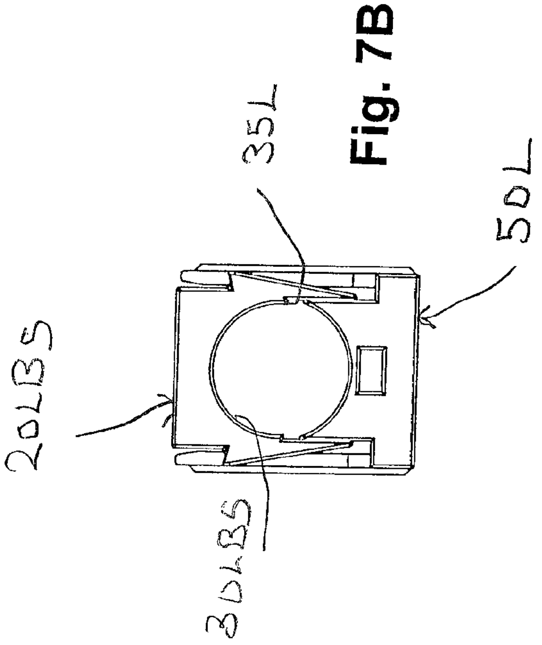
FIG. 7B is an end elevational view of the clamp assembly of FIG. 7A.
Figure 7C:
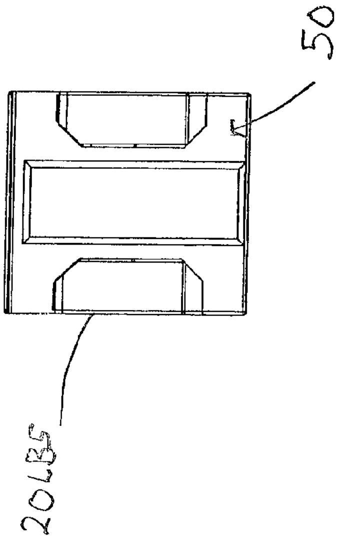
FIG. 7C is a side elevational view of the clamp assembly of FIG. 7A.

FIGS. 6A-6C illustrate an interlocked clamp assembly portion which is adapted for a representative a large size cable. Again the only changes would be in the larger dimensions of the surfaces of the clamp cradles 30L and 60L of the respective clamp members 20L and 50L. If it is desired to connect to ground via a clamp assembly which clamps the portion of the large cable where there is a bare shield, then the upper clamp member 20LBS, as illustrated in FIGS. 7A to 7C, which includes a slightly smaller surface of cradle 30LBS and a transition shoulder 35L, would be employed.

Figure 16:
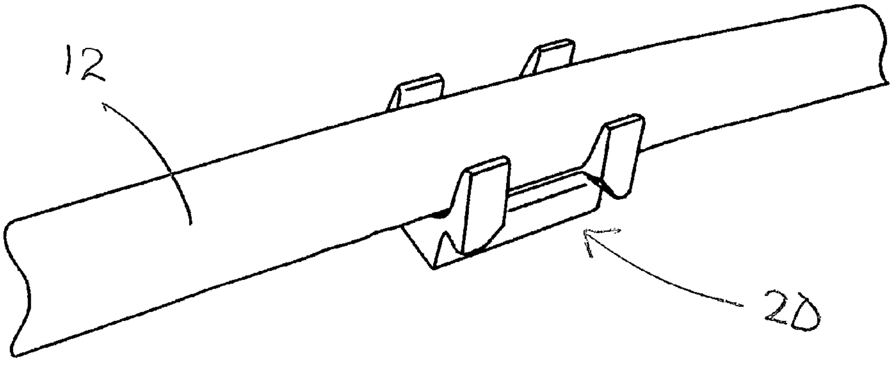
FIG. 16 is a perspective view of a first clamp member and a portion of a cable illustrating a first installation step.
Figure 17:
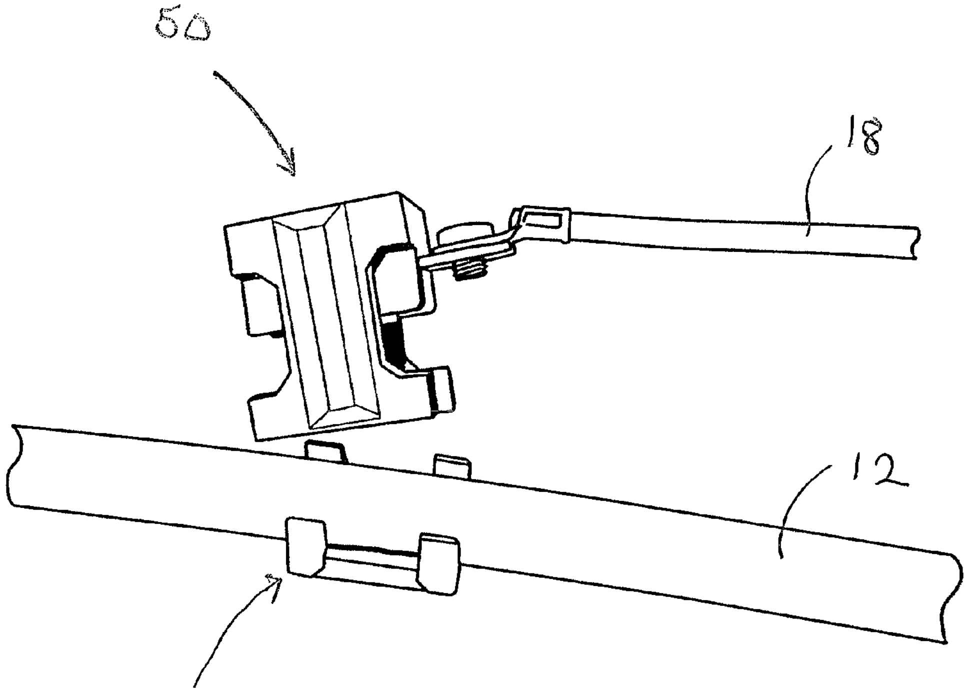
FIG. 17 is a side perspective view of the first and second clamp members and a portion of the cable illustrating a second installation step.
Figure 18:
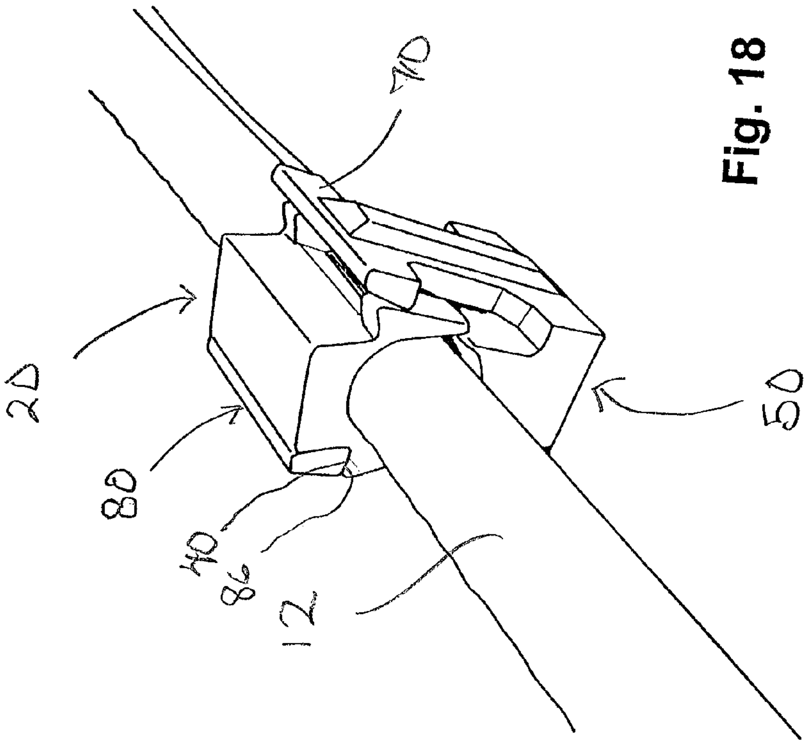
FIG. 18 is a perspective view of the first and second clamp members and a portion of the cable illustrating a third installation step.

A preferred method of installing the ground clamp assembly 10 is illustrated in FIGS. 16-19. The clamps 20 and 50 are initially selected for the cable size and whether the clamp assembly is installed around an insulated portion of the cable or a bare shield portion. The cable portion is first placed in the cable cradle 30 of top clamp 20 (FIG. 16). The bottom clamp 50 is then positioned generally opposite the bottom clamp (FIG. 17). One side of the top clamp 50 is forced toward the bottom clamp 20 so that one set of shoulders 40 is engaged by the catches of locking structure 80, as illustrated in FIG. 18. The opposite locking structure 70 is resilient and slides across the ramps 42 of the locking arms.

Figure 19:
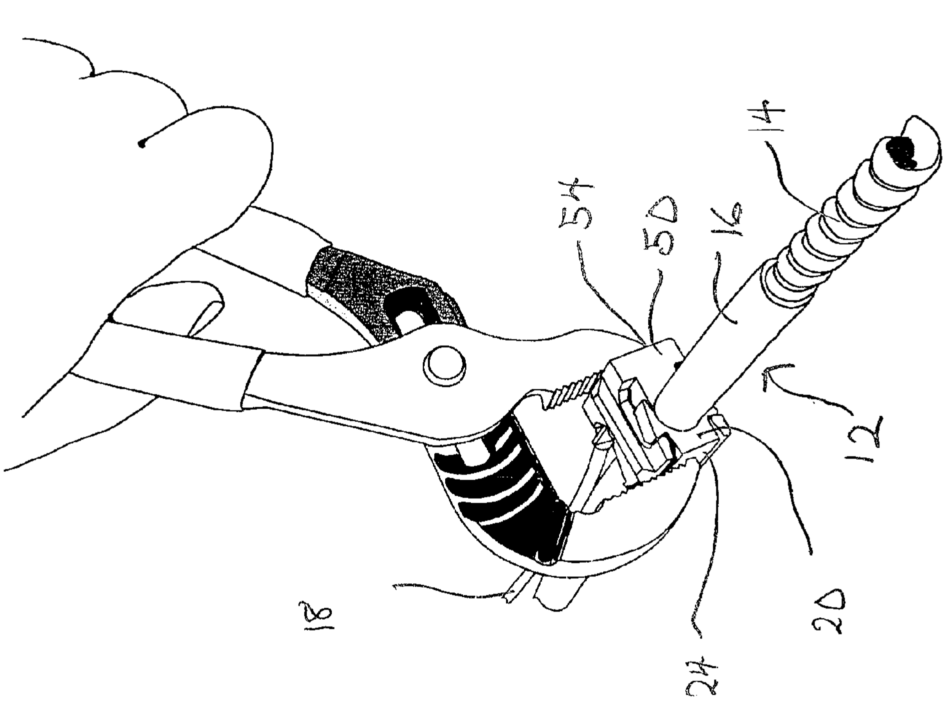
FIG. 19 is a perspective view of two clamp members and a cable and a tool used by an installer's hand as employed by a user illustrating a fourth installation step.

A pair of channel lock pliers may engage against the opposed surfaces 24, 54 of the top clamp and the bottom clamp to force the remaining unlocked shoulders and catches of locking structure 70 to engage, as best illustrated in FIG. 19. It should be appreciated that upon engagement, the prongs 102, 104 biased by resilient element 94 contact the shield by cutting through the insulation 16 to establish contact with the shield 14. Typically, five or six of the prong teeth establish contact with the shield. The ground wire 18 is then connected with ground.

Figure 20:
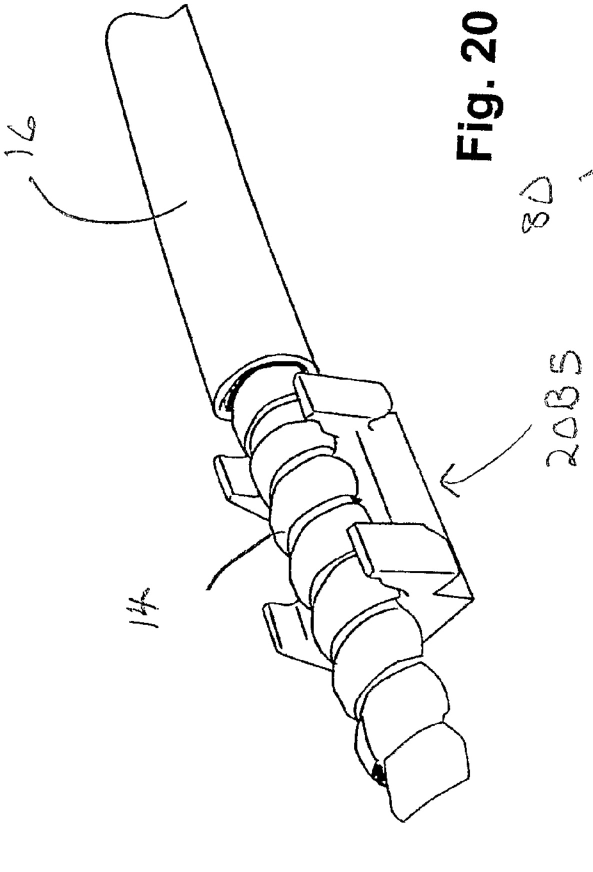
FIG. 20 is a perspective view of a first clamp member and a cable with a bare shield illustrating a first installation step.
Figure 21:
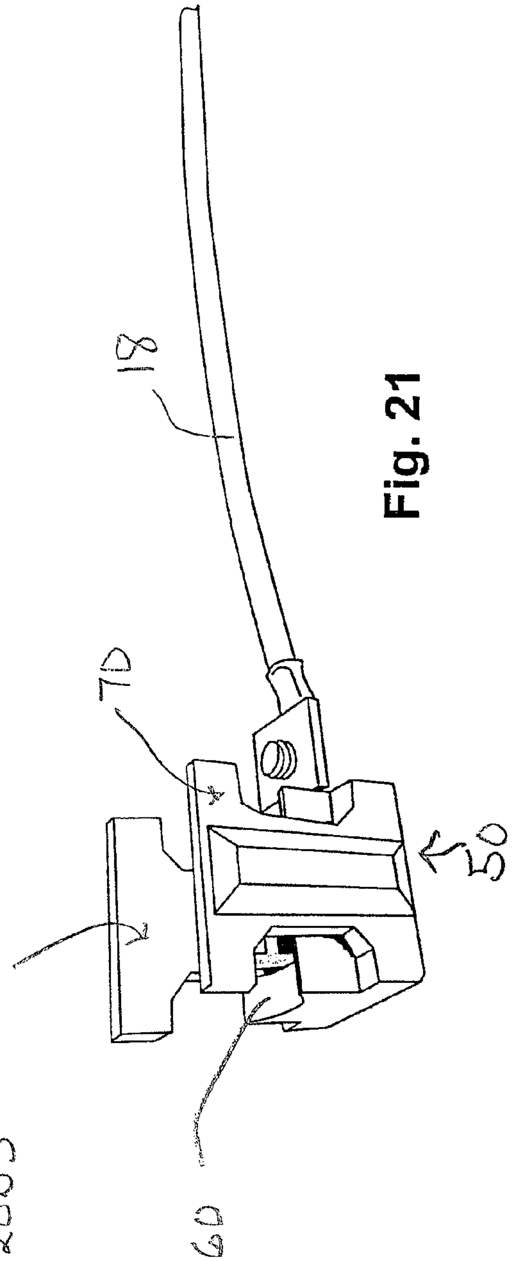
FIG. 21 is a perspective view of a clamp member which interlocks with the first clamp member and cable of FIG. 20.

With reference to FIGS. 20 and 21, substantially the same process including selection of an appropriately dimension top clamp for a bare shield would be repeated for installing the ground clamp around a bare shield. Essentially the only installation difference would be in the selection of the top clamp 20 which would be appropriately dimensioned for the bare shield for the given size cable.

While the foregoing specification has been set forth for illustrative purposes, the foregoing description should not be deemed a limitation of the invention herein. Accordingly various modifications, adaptations and alternatives may occur to one skilled in the art without departing from the spirit and scope of the invention herein.

What is claimed:

1. A grounding clamp assembly for a cable having a spiral metal shield comprising:

a first clamp having a pair of resilient laterally spaced members defining a pair of catches, a concave first cable cradle disposed between said members and defining a recess receiving an axially extending contact element having a compound bend and forming laterally spaced prongs, said contact element connecting with a conductive strip extending from said first clamp, and a resilient member biasing said contact element; and a second clamp having a medial second cable cradle at least partially defined by a concave surface and opposed pairs of locking arms having axially spaced shoulders with adjacent transition ramps, so that when said first clamp and said second clamp are forced together around said cable, said shoulders engage said catches whereby said cable is captured between said first and second cradles and said contact element engages said shield.

2. The grounding clamp assembly of claim 1 wherein said members have a substantially T-shape.

3. The ground clamp assembly of claim 1 and further comprising a ground wire connecting said strip.

4. The ground clamp assembly of claim 1 wherein said contact element comprises laterally spaced prongs each having a plurality of contact teeth.

5. The ground clamp assembly of claim 4 wherein there are three teeth.

6. The ground clamp assembly of claim 1 wherein said resilient member has a rubber composition.

7. The ground clamp assembly of claim 1 wherein said shoulders are inwardly inclined and complementary in orientation to said catches.

8. The ground clamp assembly of claim 1 wherein said second engagement cradle has a substantially U-shaped profile.

9. A grounding clamp assembly for a cable having a spiral metal shield comprising:

a first clamp having a pair of resilient laterally spaced members defining a pair of catches, a concave first cable cradle disposed between said members and defining a recess receiving an axially extending contact element comprising laterally spaced prongs each having a plurality of contact teeth, said contact element connecting with a conductive strip extending from said first clamp, and a resilient member biasing said contact element; and a second clamp having a medial second cable cradle at least partially defined by a concave surface and opposed pairs of locking arms having axially spaced shoulders with adjacent transition ramps, so that when said first clamp and said second clamp are forced together around said cable, said shoulders engage said catches whereby said cable is captured between said first and second cradles and said contact element engages said shield.

10. The ground clamp assembly of claim 9 wherein there are three teeth.

11. The grounding clamp assembly of claim 9 wherein said members have a substantially T-shape.

12. The ground clamp assembly of claim 9 and further comprising a ground wire connecting said strip.

13. The ground clamp assembly of claim 9 wherein said resilient member has a rubber composition.

14. The ground clamp assembly of claim 9 wherein said shoulders are inwardly inclined and complementary in orientation to said catches.

15. The ground clamp assembly of claim 9 wherein said second engagement cradle has a substantially U-shaped profile.

* * * * *